United States Patent
Raeker et al.

(10) Patent No.: US 11,333,798 B2
(45) Date of Patent: May 17, 2022

(54) COMPOUND METAOPTICS FOR AMPLITUDE AND PHASE CONTROL OF WAVEFRONTS

(71) Applicant: The Regents Of The University of Michigan, Ann Arbor, MI (US)

(72) Inventors: Brian Raeker, Ann Arbor, MI (US); Anthony Grbic, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 286 days.

(21) Appl. No.: 16/502,817

(22) Filed: Jul. 3, 2019

(65) Prior Publication Data
US 2021/0063605 A1     Mar. 4, 2021

Related U.S. Application Data

(60) Provisional application No. 62/694,746, filed on Jul. 6, 2018.

(51) Int. Cl.
*G02B 1/00*     (2006.01)
*G02B 5/30*     (2006.01)
*G03H 1/02*     (2006.01)

(52) U.S. Cl.
CPC ........... *G02B 1/002* (2013.01); *G02B 5/3025* (2013.01); *G03H 1/02* (2013.01); *G03H 2001/0216* (2013.01)

(58) Field of Classification Search
CPC .. G02B 1/002; G02B 5/3025; G02B 27/0927; G03H 1/02; G03H 2001/0216;
(Continued)

(56) References Cited

U.S. PATENT DOCUMENTS

| | | | |
|---|---|---|---|
| 2015/0219806 A1* | 8/2015 | Arbabi | G02B 5/1847 359/573 |
| 2016/0361002 A1* | 12/2016 | Palikaras | A61B 5/0507 |

(Continued)

OTHER PUBLICATIONS

Amin Rajbar and Anthony Grbic, Broadband, Multiband, and Multifunctional All-Dielectric Metasurfaces, Physycail Review Applied 11, May 23, 2019, pp. 054066-1-054066-15.

(Continued)

*Primary Examiner* — Darryl J Collins
*Assistant Examiner* — Matthew Y Lee
(74) *Attorney, Agent, or Firm* — Harness, Dickey & Pierce, P.L.C.

(57) ABSTRACT

A compound metaoptic is presented. The compound metaoptic is comprised of at least two phase-discontinuous metasurfaces, which can convert an incident light beam to an aperture field with a desired magnitude, phase, and polarization profile. Each of the constitutive metasurfaces is designed to exhibit specific refractive properties, which vary along the metasurface. Furthermore, due to its transmission-based operation, the metaoptic can operate without lenses and be low profile: potentially having a thickness on the order of a few wavelengths or less. A systematic design procedure is also presented, which allows conversion between arbitrary complex-valued field distributions without reflection, absorption or active components. Such compound metaoptics may find applications where a specific complex field distribution is desired, including displaying holographic images and augmented or virtual reality systems.

12 Claims, 13 Drawing Sheets

(58) Field of Classification Search
CPC .......... G03H 2240/61; G03H 2225/33; G03H 2225/60; G03H 2225/22; G02F 2202/30; G02F 1/01; G02F 1/0063; G02F 1/19
See application file for complete search history.

(56) References Cited

U.S. PATENT DOCUMENTS

| | | | |
|---|---|---|---|
| 2017/0316772 A1* | 11/2017 | Park ................... | G10K 11/172 |
| 2019/0064532 A1* | 2/2019 | Riley, Jr. ........... | G02B 27/0916 |
| 2019/0173191 A1 | 6/2019 | Kamali et al. | |
| 2020/0025975 A1* | 1/2020 | Kamali ............. | G02B 1/002 |
| 2020/0028278 A1* | 1/2020 | Tomasic ............. | H01Q 15/244 |
| 2021/0126330 A1* | 4/2021 | Urzhumov ........... | H03H 9/66 |

OTHER PUBLICATIONS

Mohammadreza Khorasaninejad, et al., Metalenses at visible wavelengths: Diffraction-limited focusing and subwavelength resolution imaging, Science Magazine, vol. 352—Issue 6290, Jun. 3, 2016, pp. 1190-1194.
Amir Arbabi, et al., Dielectric metasurfaces for complete control of phase and polarization with subwavelength spatial resolution and high transmission, Aug. 31, 2015, pp. 937-943, Nature Nanotechnology, vol. 10.
Carl Pfeiffer and Anthony Grbic, Bianisotropic Metasurfaces for Optimal Polarization Control: Analysis and Synthesis, Physical Review Applied 2, Oct. 23, 2014, pp. 044011-1-044011-11.

* cited by examiner

COMPOUND METAOPTICS FOR AMPLITUDE AND PHASE CONTROL OF WAVEFRONTS

CROSS-REFERENCE TO RELATED APPLICATIONS

This application claims the benefit of U.S. Provisional Application No. 62/694,746 filed on Jul. 6, 2017. The entire disclosure the above application is incorporated herein by reference.

GOVERNMENT CLAUSE

This invention was made with government support under Grants No. N00014-15-1-2390 and N00014-18-1-2536 awarded by the U.S. Navy, Office of Naval Research. The Government has certain rights in this invention.

FIELD

The present disclosure relates to compound metaoptics for amplitude and phase control of wavefronts.

BACKGROUND

Metasurfaces are two-dimensional arrays of sub-wavelength polarizable inclusions, which aggregately manipulate an electromagnetic wave. These inclusions, or unit cells, are arranged in single- or few-layer stacks and are electrically or optically thin. In general, the electromagnetic interactions can be approximated as surface boundary conditions, simplifying analysis and design. A distinct application of metasurfaces is their ability to impart tailored phase discontinuities onto incident wavefronts, demonstrating functionalities such as focusing, refraction, and polarization control.

If the metasurface is restricted to be passive, lossless, and reflectionless, the local power density of an incident wave normal to the surface is maintained when transmitted through the metasurface. We denote this local power density normal to a surface as the local power flux. Such metasurfaces exhibit high transmission efficiency but only reshape the phase profile of an incident wavefront and not its local power density profile. As a result, a single phase-only metasurface cannot independently control both the phase and power density distributions of a transmitted field. Specifically, this can result in speckle noise (random fluctuations in amplitude) in holographic images formed with a phase-only metasurface. Amplitude and phase control over an incident wavefront can suppress speckle in an image, as shown by the complex-valued holograms. However, such field control has not been demonstrated using reflectionless metasurfaces free of absorption and polarization losses.

This section provides background information related to the present disclosure which is not necessarily prior art.

SUMMARY

This section provides a general summary of the disclosure, and is not a comprehensive disclosure of its full scope or all of its features.

A compound metaoptic is presented. The compound metaoptic is comprised of a first metasurface spatially separated by a distance from a second metasurface. The first metasurface is configured to receive electromagnetic radiation incident thereon and operates to refract the electromagnetic radiation onto the second metasurface without reflection and loss and thereby change the power density distribution of the electromagnetic radiation at surface of the second metasurface. The second metasurface is configured to receive the refracted electromagnetic radiation from the first metasurface and operates to correct the phase of the electromagnetic radiation to match a target phase distribution or a target polarization distribution. The first metasurface and the second metasurface preferably exhibit bianisotropic properties.

In some embodiments, the first metasurface and the second metasurface are further defined as Huygens' metasurfaces.

In another aspect of this disclosure, a method is presented for designing a compound metaoptic. The method includes: receiving an amplitude profile for a source electromagnetic wave; receiving a phase profile for the source electromagnetic wave; receiving a target amplitude profile for a target electromagnetic wave; receiving a target phase profile for the target electromagnetic wave; computing fields between the first metasurface and the second metasurface while conserving power flow through the first metasurface and the second metasurface; determining the electromagnetic properties of the first metasurface and the electromagnetic properties of the second metasurface using the computed fields; constructing the first metasurface in accordance with determined electromagnetic properties of the first metasurface; and constructing the second metasurface in accordance with the determined electromagnetic properties of the second metasurface. A compound metaoptic can then be formed from the first metasurface and the second metasurface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
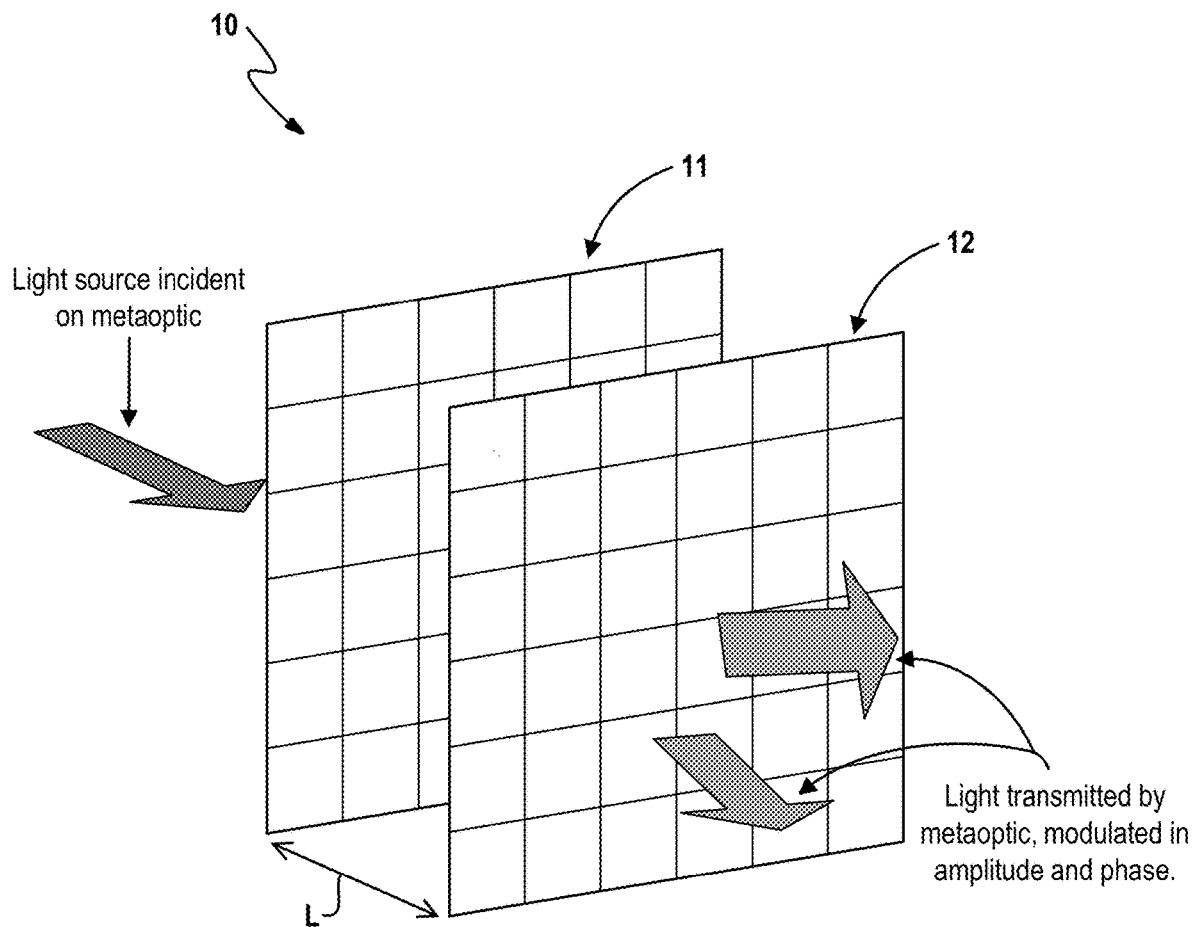
FIG. 1A is a diagram of an example compound metaoptic.
Figure 1B:
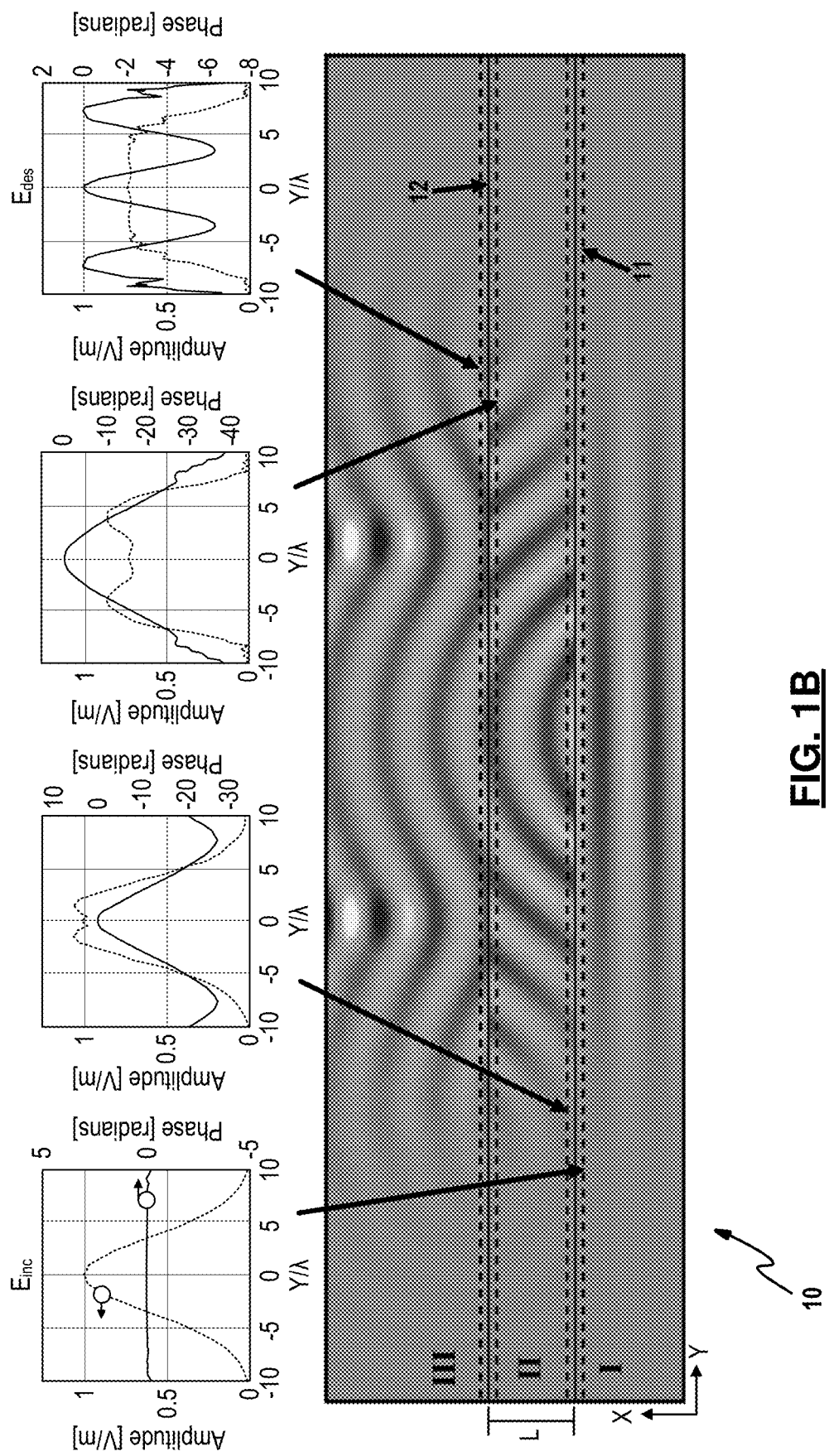
FIG. 1B is a diagram showing two metasurfaces forming the compound metaoptic and establishing three regions of space, where the inset images show how the amplitude and phase profiles change before and after each metasurface.

Compound metaoptics are introduced which can control both the amplitude and phase of a wavefront in a passive, lossless, and reflectionless manner. A compound metaoptic is a collection of individual metasurfaces arranged along an axis, analogous to an optical compound lens. With additional degrees of freedom, compound metaoptics can achieve electromagnetic responses which are difficult or impossible to achieve with a single metasurface. With reference to FIGS. 1A and 1B, two paired metasurfaces can be used to achieve both phase control (beam steering) and amplitude control (beam shaping) in a low-loss, low-profile manner. This approach promises higher diffraction efficiencies than conventional holograms since both amplitude and phase are controlled with subwavelength pixelation.

In one example, a pair of phase-discontinuous metasurfaces are used to mold the incident wavefront and form prescribed power density and phase distributions. The metasurfaces act as two phase planes: two reflectionless, inhomogeneous surfaces that each locally manipulate the phase of the transmitted wave front. Together, the two phase planes provide two degrees of freedom to control two wavefront characteristics: the amplitude and phase profiles. In the proposed arrangement, the first metasurface reshapes the incident field power density to form the desired power density at the second metasurface. The second metasurface provides a phase correction to establish the desired amplitude and phase distributions. The method is scalable from microwave to visible wavelengths.

FIG. 1A shows the geometry for an example embodiment of the compound metaoptic 10, where two phase-discontinuous metasurfaces 11, 12 are separated by a distance L. In this example, Huygens' metasurfaces locally control the transmission phase, and can eliminate reflections (maximize transmission) by maintaining a wave impedance match to the surrounding medium. Therefore, Huygens' metasurfaces are excellent candidates to provide the desired reflectionless, phase-discontinuous boundaries. Such metasurfaces can be implemented as multi-sheet structures, where the overall thickness is sub-wavelength (electrically or optically thin). While reference is made to Huygens' metasufaces, other types of metasurfaces are contemplated by this disclosure.

Extreme field control is required when transforming the amplitude and phase distributions of the source electromagnetic radiation $E_{inc}$ (incident on metasurface 1) to the desired complex-valued field $E_{des}$ (transmitted by metasurface 2) over a wavelength-scale distance L. Specifically, it requires wide angles of refraction at the two phase planes. Huygens' metasurfaces, with induced electric and magnetic polarization currents, are practically reflectionless over a moderate range of incident/transmission angles. However, for the wide angles of refraction required for short distances L, Huygens metasurfaces begin to exhibit reflection. These reflections are due to the different local wave impedances of the incident and transmitted fields.

In an example embodiment, the first metasurface 11 and the second metasurface 12 exhibit bianisotropic properties. Such reflections are mitigated by using bianisotropic surface parameters: electric, magnetic, and magneto-electric responses. In addition to providing the needed transmission phases, bianisotropic metasurfaces serve as impedance matching layers. This allows a reflectionless transition between a wave locally incident at one angle and refracted to another. Finally, it should be noted that where wide-refraction angles are not required (e.g. when the wave propagation is predominately paraxial), simple Huygens metasurfaces without magneto-electric parameters may suffice.

Figure 2A:
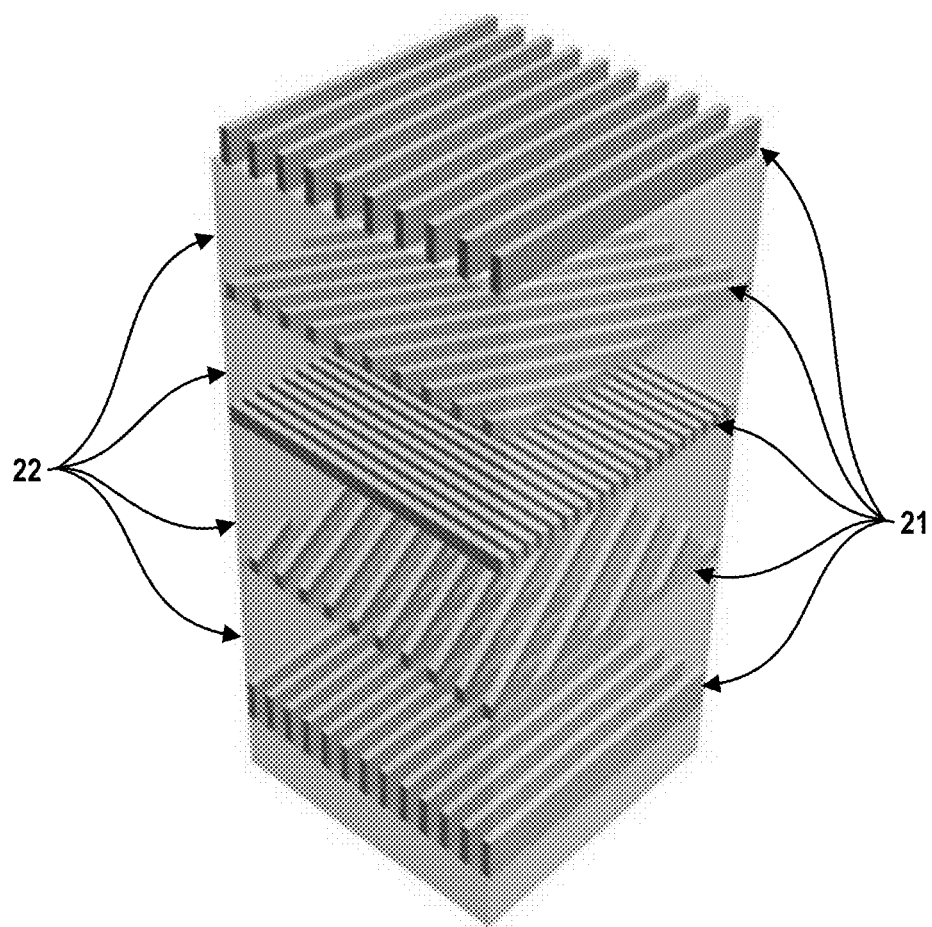
FIGS. 2A-2C are diagrams showing example implementations for metasurfaces which may comprise the compound metaoptic.
Figure 2B:
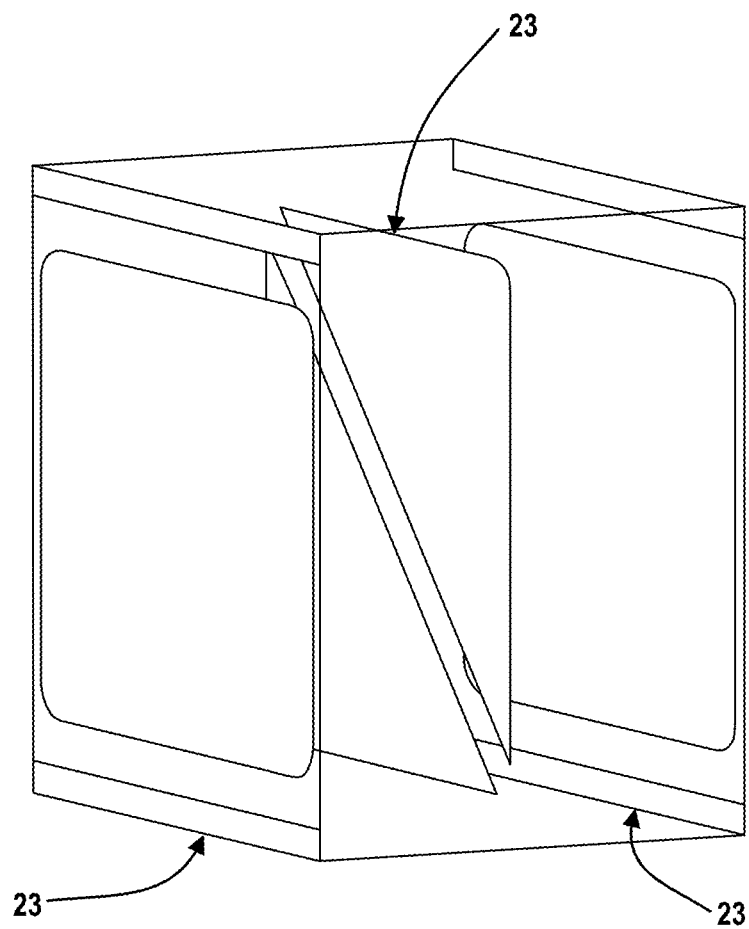
Figure 2C:
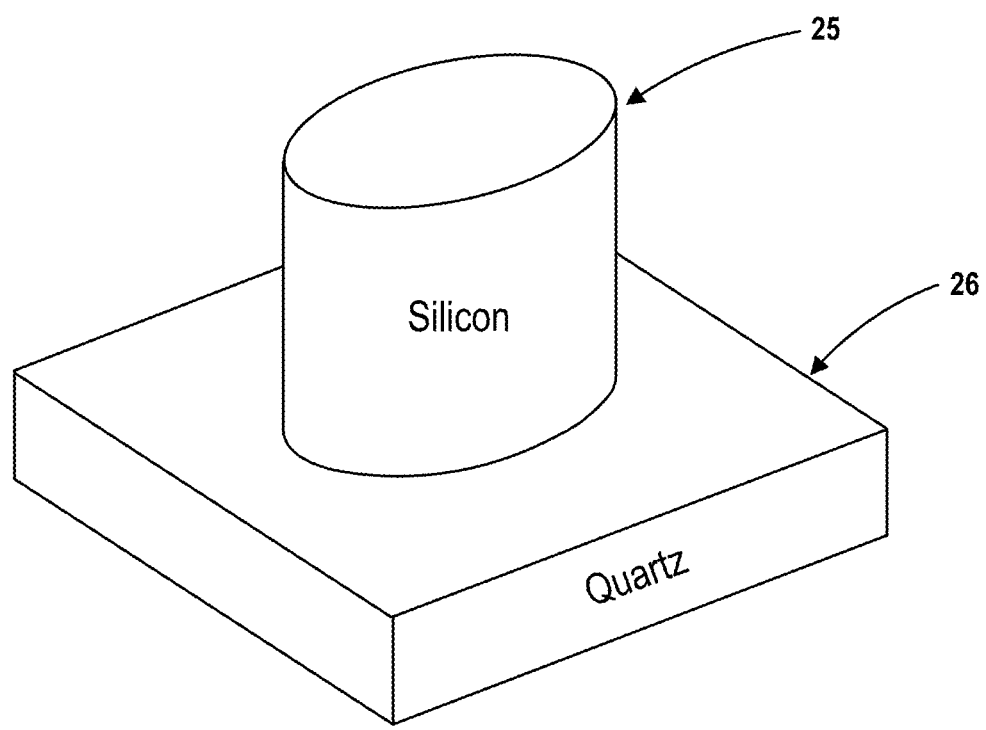

Metasurface implementations can take different forms as seen in FIGS. 2A-2C. In FIG. 2A, the metasurface is comprised of a series of dielectric gratings 21 separated by dielectric spacers 22. The dielectric gratings have different orientations and fill factors to provide specific manipulations of an incident wave. This metasurface can also provide different functions at different bandwidths. This implementation can be made low-loss and low-reflection, as desired by the compound metaoptic 10. For further details regarding this example implementation, reference may be had to an article by A. Ranjbar and A. Grbic, "Broadband, Multiband, and Multifunctional All-Dielectric Metasurfaces", Phys. Rev. Applied, Vol. 11, 054066 (2019).

In FIG. 2B, the metasurface is comprised of multiple impedance sheets 23 (patterned metallic or plasmonic claddings) cascaded in the propagation direction of the electromagnetic radiation. An electric impedance sheet (or sheet admittance) describes the interaction of an impinging electromagnetic wave with the elements located on the boundary. A two-dimension copper sheet design, commonly utilized in printed circuit board applications, can produce the desired sheet admittances. This metasurface can be designed to produce specific transmission and reflection parameters (in amplitude and phase) when illuminated by an incident electromagnetic wave. This implementation can be made low-loss and low-reflection, as desired by the compound metaoptic 10. For further details regarding this example implementation, reference may be had to an article by C. Pfeiffer and A. Grbic, "Bianisotropic Metasurfaces for Optimal Polarization Control: Analysis and Synthesis" Phys. Rev. Applied, Vol. 2, 044011 (2014).

In yet another implementation, the metasurface is comprised of an array of dielectric pillars held on a handle wafer of quartz or other dielectric material. One implementation is to have silicon pillars 25 arranged on a quartz handle wafer 25 as seen in FIG. 2C. The size and cross-section of the dielectric pillar determines the phase shift impressed on an incident electromagnetic wave. The desired phase shift of the metasurface can be realized by arranging pillars of different sizes in an array. This implementation can be made low-loss and low-reflection, as desired by the compound metaoptic 10. For further details regarding this example implementation, reference may be had to articles by A. Arbabi, Y. Horie, M. Bagheri and A. Faraon, "Dielectric metasurfaces for complete control of phase and polarization with subwavelength spatial resolution and high transmission" Nature Nanotechnology, Volume 10, pages 937-943 (2015), and by M. Khorasaninejad, W. T. Chen, R. C. Devlin, J. Oh, A. Y. Zhu, F. Capasso, "Metalenses at visible wavelengths: Diffraction-limited focusing and subwavelength resolution imaging", Science, Vol. 352, Issue 6290, pp. 1190-1194 (3 Jun. 2016). Other implementations for the metasurfaces also fall within the broader aspects of this disclosure.

Figure 3:
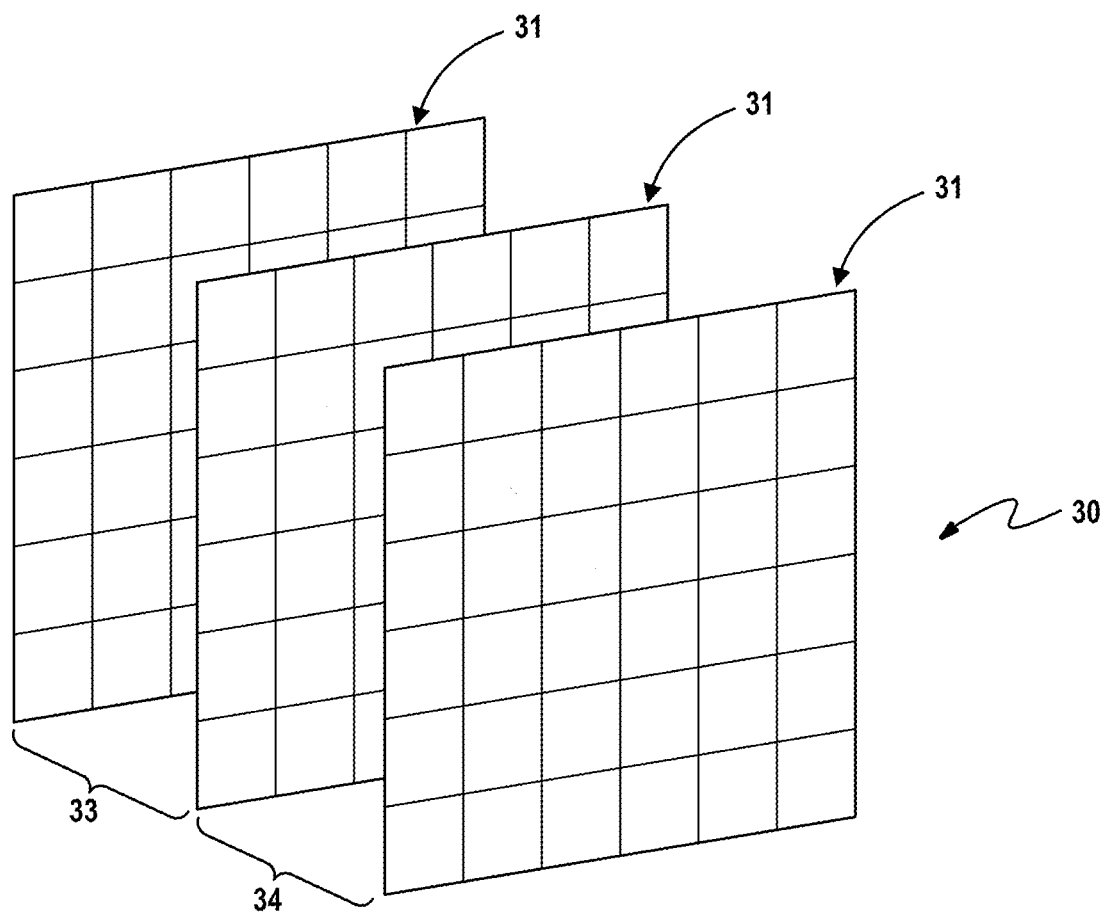
FIG. 3 is a diagram depicting another example embodiment of a compound metaoptic.

FIG. 3 depicts another example embodiment of a compound metaoptic 30. In this embodiment, the compound metaoptic 30 is comprised of three metasurfaces 31 forming two constitutive metaoptics 33 and 34. The two constitutive metaoptics 33, 34 share a metasurface. The first constitutive metaoptic 33 will form an intermediate electromagnetic wave and the second constitutive metaoptic 34 will form the desired output electromagnetic wave. Except with respect to the differences discussed herein, the compound metaoptic 30 is substantially the same as the compound metaoptic 10.

Figure 4:
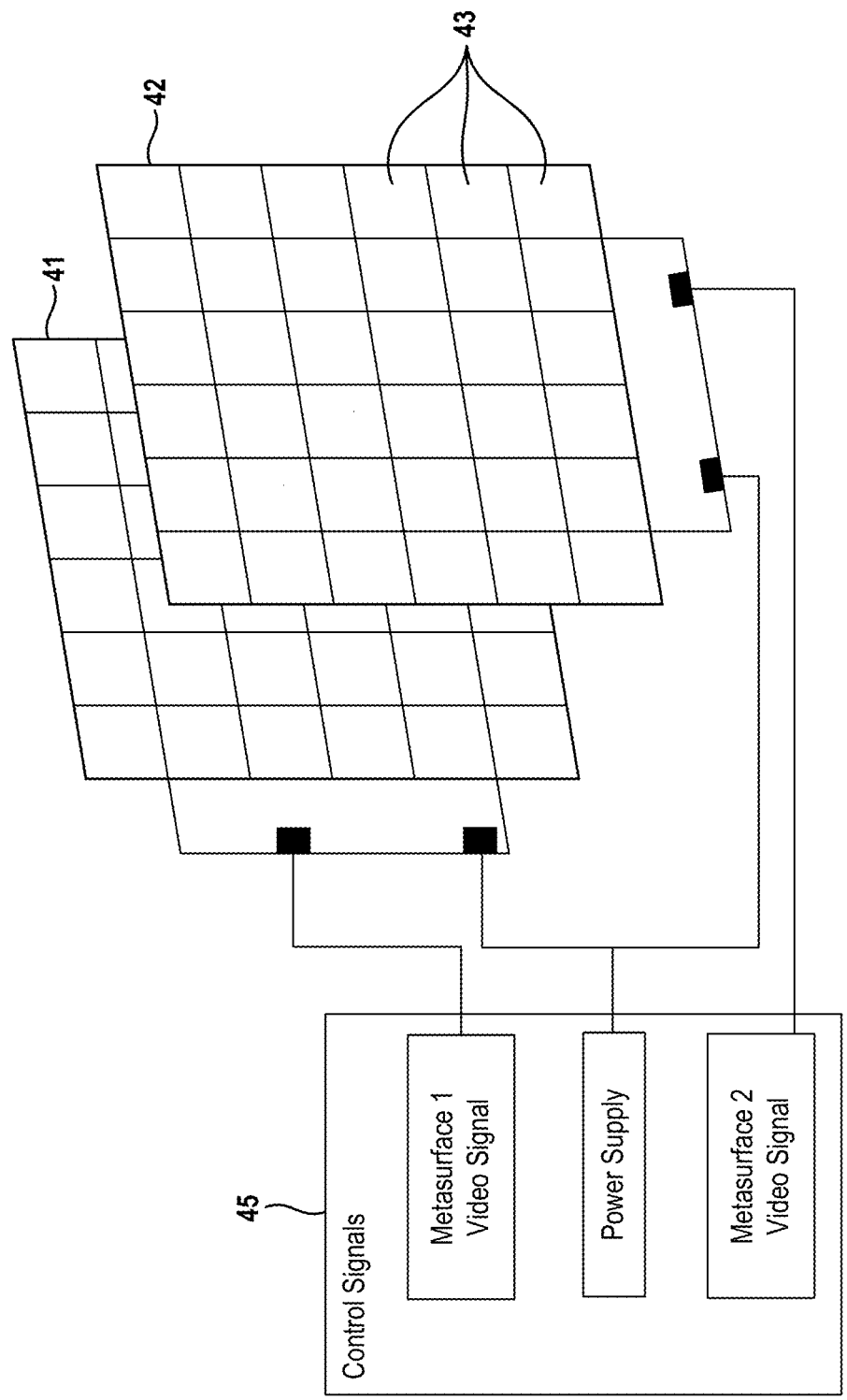
FIG. 4 is a diagram of a tunable implementation of a compound metaoptic.

A tunable implementation of a compound metaoptic 40 is shown in FIG. 4. In this embodiment, the first metasurface 41 and the second metasurface 42 are divided into a plurality of unit cells 43. A controller 45 is electrically coupled to the first metasurface 41 and the second metasurface 42. A bias voltage may be applied by a power source individually or collectively to a subset of the unit cells which comprise a metasurface. These bias voltages are intended to dynamically control the metaoptic performance. For example, a unit cell exhibits a different transmission phase shift on electromagnetic radiation in response to an applied bias voltage. Other techniques for dynamically tuning performance of the compound metaoptic also fall within the scope of this disclosure.

Figure 5:
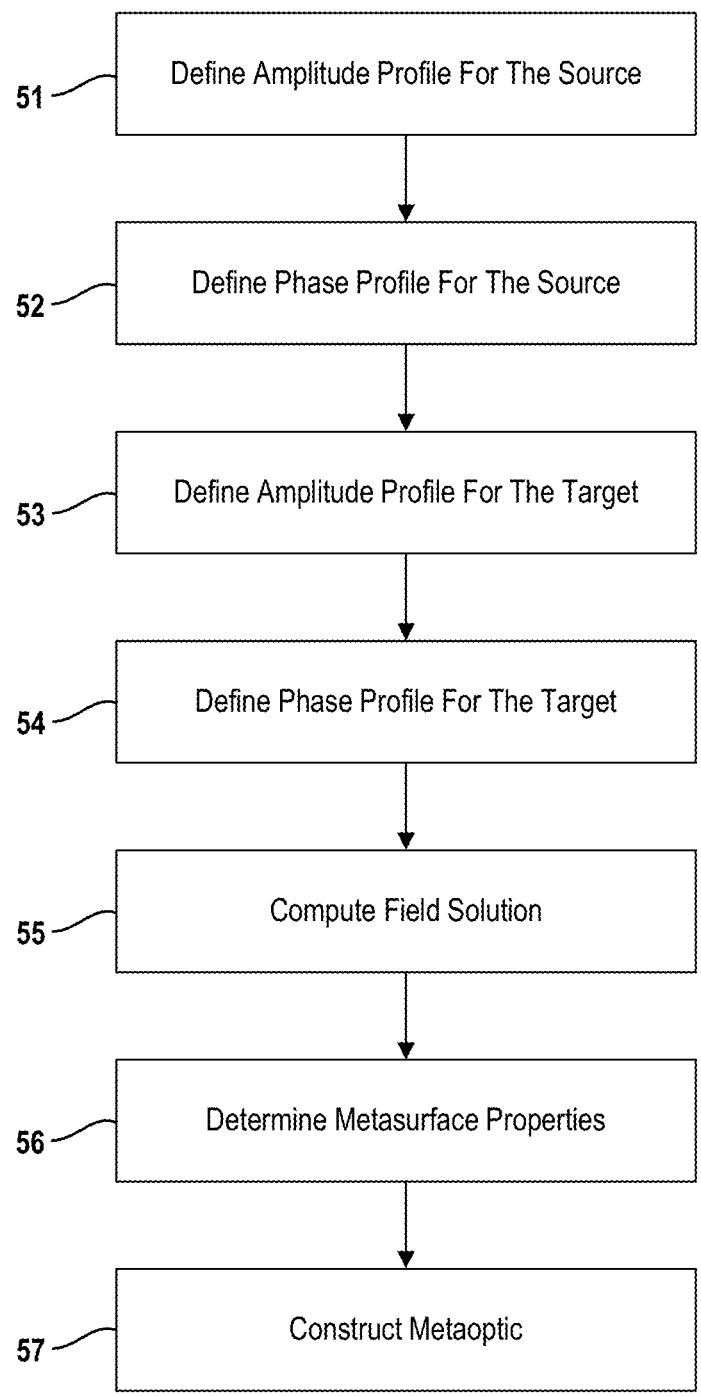
FIG. 5 is a flowchart showing an overview for designing a compound metaoptic.

FIG. 5 provides an overview for designing a compound metaoptic. As a starting point, the field profiles for the source electromagnetic wave and the desired electromagnetic wave are defined. More specifically, a source amplitude profile and a source phase profile are defined for the source electromagnetic wave as indicated at 51 and 52. Likewise, a desired amplitude profile and a desired phase profile are defined for the desired output electromagnetic wave as indicated at 53 and 54.

The design of the compound metaoptic involves two general steps. First, the field solution between the first metasurface and the second metasurface (i.e., region II in FIG. 1B) is computed at 55. This solution links the incident local power density profile to the desired local power density profile. The second step is to compute the electromagnetic parameters of each metasurface, which are needed to realize the phase discontinuities as indicated at 56. This step determines the bianisotropic properties of each metasurface, for example implemented here as asymmetric cascades of three electric surface impedance sheets.

A transverse electric field polarization with respect to the metasurface ($\hat{z}$-polarized) is assumed in the discussion, but the method applies to the transverse magnetic polarization. To simplify the discussion, it is assumed that the fields are invariant in the $\hat{z}$-direction, but the method also applies to fields that are variant in the $\hat{z}$-direction. In the two-dimensional problems considered here, each metasurface is inhomogeneous along the y-direction and is invariant in the z-direction. Additionally, a time convention of $e^{iwt}$ is assumed.

The first step in forming the desired complex-valued field is to determine the phase-shift profiles of each metasurface. Phase-retrieval algorithms are commonly used to determine the phase profile of a wave forming two field amplitude patterns separated by a propagation distance. One such method is the Gerchberg-Saxton algorithm, which obtains the phase profiles by forward and reverse-propagating complex-valued field distributions between the two planes. After each propagation step, the field amplitude is replaced with the correct amplitude profile, whereas the phase is retained. This action imposes the amplitude profiles as partial constraints for iteratively determining the complex-valued field at each plane. The algorithm iterates until converging to a phase distribution, which creates the two amplitude patterns.

However, directly applying a phase profile to a field amplitude will generally alter the local power flux of the complex-valued field. To ensure the conservation of local power flux, the field amplitude profiles used in the Gerchberg-Saxton algorithm must be modified to exhibit the incident and desired local power flux distributions with each iteration. As a result, the partial constraint conditions of the modified Gerchberg-Saxton algorithm enforce the stipulated local power flux instead of the electric field amplitude. This substitution of constraint conditions is straightforward because the local power flux and field amplitude are related quantities when the phase is stipulated.

The stipulated local power flux profile at each plane is calculated from the known complex-valued electric fields exterior to the metaoptic: either $E_{inc}$ for the first plane or $E_{des}$ for the second. The plane wave spectrum of the electric field is calculated and divided by the TE wave impedance for each plane wave component to determine the plane wave spectrum of the tangential magnetic field $H_y$. The spatial $H_y$ field is then calculated and used to determine the stipulated local power flux at each boundary.

The original Gerchberg-Saxton algorithm is modified by scaling the electric field amplitude such that the stipulated local power flux profile is maintained. Before each propagation step of the algorithm, the phase profile estimate is applied to an assumed electric field amplitude ($|E_{inc}|$ at plane 1, or $|E_{des}|$ at plane 2). The tangential magnetic field is determined from the electric field using the previously described method, allowing the local TE wave impedance $\eta$ for the wave to be calculated. If the local TE wave impedance is assumed to remain unchanged after scaling the electric field, the complex-valued electric field profile with the stipulated power flux S and current iteration phase estimate $\phi$ can be calculated as $$E = \frac{|\eta|\sqrt{2S}}{\sqrt{\mathrm{Re}\{\eta\}}} e^{j\phi} \qquad (1)$$

This electric field is propagated to the other plane, where the phase is retained and used to calculate another electric field estimate with the stipulated local power flux.

The algorithm is iterated until the propagated fields at each plane exhibit the stipulated local power flux profiles ($S_{inc}$ at plane 1 and $S_{des}$ at plane 2). The resulting phase profiles of the field transmitted by metasurface 1, $\phi_{t1}$, and incident on metasurface 2, $\phi_{i2}$, are used to calculate the metasurface phase discontinuities as $$\phi_{MS1} = \phi_{t1} - \phi_{inc} \qquad (2)$$

$$\phi_{MS2} = \phi_{des} - \phi_{i2} \qquad (3)$$

Overall, the modified power-conserving Gerchberg-Saxton algorithm takes two complex-valued field profiles as inputs ($E_{inc}$ and $E_{des}$) and produces the phase-discontinuity profiles of the two metasurfaces as outputs.

In one example, the Gerchberg-Saxton phase retrieval algorithm is commonly used to iteratively reconstruct the phase profile of a wavefront from two intensity patterns taken at different planes. Since the fields are complex-valued at each plane, the two intensity profiles serve as partial constraints which must be satisfied when determining the wavefront's phase profile. The phase profile is iteratively determined to link the intensity measurements through propagation between the two planes.

The Gerchberg-Saxton algorithm most commonly uses intensity measurements taken at planes in the radiative near-field and the far-field, or before and after a lens. In this case, a single Fourier transform is used to propagate the complex-valued field from the first plane (radiative near-field) to the second (far-field). An inverse Fourier transform is used to reverse propagate the complex-valued field from the second plane to the first.

However, since the compound metaoptic has a finite thickness, the field profiles must be propagated between planes that are both in the radiative near field. Therefore, the propagation step of the Gerchberg-Saxton algorithm does not simply involve Fourier and inverse Fourier transforms but rather plane wave propagation. Plane wave propagation involves Fourier transforming the complex-valued field in the spatial domain, propagating the resulting plane wave spectrum to the adjacent plane, and then inverse Fourier transforming the spectrum to obtain the complex-valued field in the spatial domain at the other plane.

A second modification must be made to the Gerchberg-Saxton algorithm since the bianisotropic Huygens' metasurfaces comprising the metaoptic maintain the local power flux, not the local electric field amplitude (conventional Gerchberg-Saxton algorithm), through the surface. The second modification uses the local power flux profiles as the partial constraints on the field in place of the electric field amplitudes. Specifically, the amplitude of the propagated field is replaced with an amplitude profile exhibiting the stipulated local power flux distribution for an electric field with the current phase profile. With each iteration, the phase estimate of the wavefront is improved until the local power flux profiles of the propagated fields match the stipulated local power flux profiles.

The stipulated local power flux profiles are $S_{inc}$ at the first plane (first metasurface) and $S_{des}$ at the second plane (second metasurface). The phase of the electric field transmitted through the first plane (first metasurface) is denoted as $\phi_{t1}$, and the phase of the field incident onto the second plane (second metasurface) is denoted as $\phi_{i2}$. The modified algorithm follows four general steps. In each iteration:

1. A first estimate of the complex field transmitted by the first plane ($E_{t1}$) is formed by applying the current estimate of the phase profile, $\phi_{t1}$, to the incident electric field amplitude $|E_{inc}|$. This field estimate does not maintain the local power flux as required by the metasurfaces. Therefore, the field amplitude must be modified. After calculating the local wave impedance ($\eta$) of the field estimate, the modified field amplitude is calculated using $S_0 = S_{inc}$ in equation (1). This field estimate satisfies the local power flux profile partial constraint required at plane 1, while exhibiting the current estimate of the phase profile. For the first iteration, any phase profile, $\phi_{t1}$ can be used.

2. The field estimate at the first plane is propagated to the second plane. That is, each spectral component is multiplied by the phase term $e^{-ik_xL}$. For early iterations, the resulting local power flux profile may be quite different from the stipulated local power flux profile ($S_{des}$) at the second plane, but approaches it as the algorithm iterates.

3. The phase of the propagated field, $\phi_{i2}$, is retained and applied to the magnitude of the desired field profile, $|E_{des}|$ to produce the first estimate of the complex-valued field at the second plane. This estimate does not conserve local power flux, and must be further modified. Assuming that the TE wave impedance of this field is correct, the field amplitude exhibiting the stipulated local power flux $S_{des}$ and phase $\phi_{i2}$ is calculated using equation (1). The resulting field estimate satisfies the partial constraint (local power flux profile) at plane 2, and exhibits the current phase estimate.

4. This field estimate is reverse propagated to the first plane which amounts to multiplying each spectral component by the phase term $e^{-ik_xL}$. The phase of this field becomes the current estimate of the phase profile $\phi_{t1}$, and is used in the next iteration of the algorithm.

Figure 6:
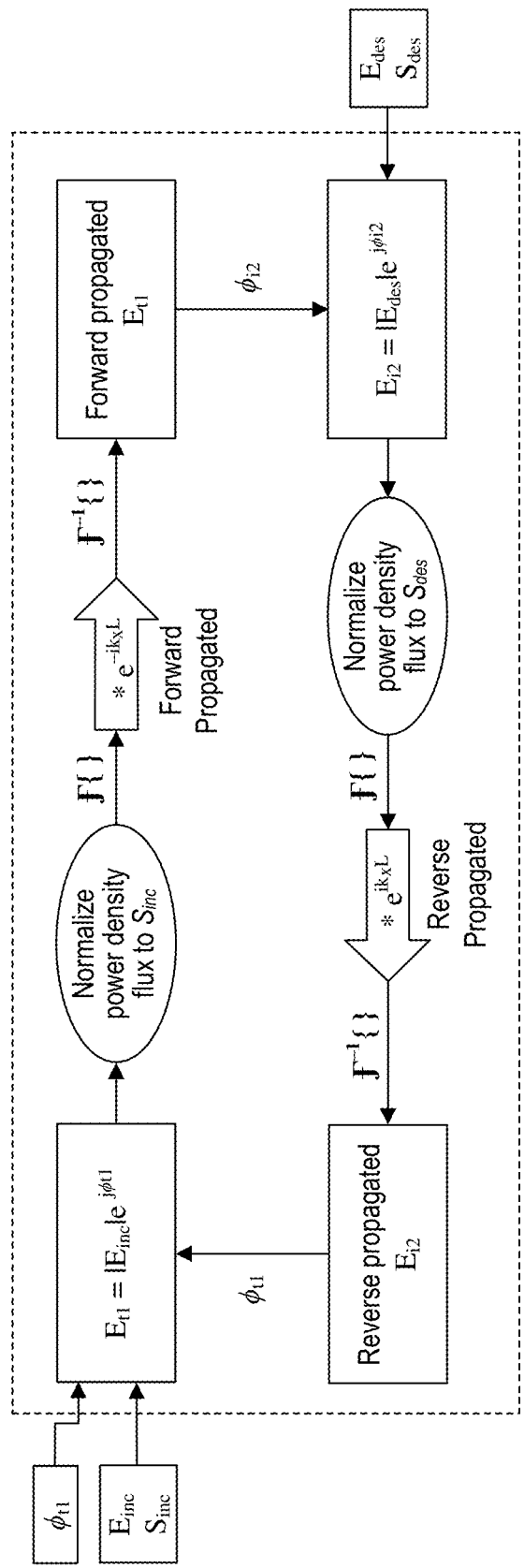
FIG. 6 is a block diagram of the power conserving phase retrieval algorithm: modified Gerchberg-Saxton algorithm.

These steps are repeated until the error between the propagated local power flux and the desired local power flux profiles is acceptably low (e.g., less than a predetermined threshold). Once the algorithm converges, the phase distribution of the fields within region II are known. FIG. 6 shows a flowchart of the modified (power conserving) Gerchberg-Saxton algorithm. Once the modified Gerchberg-Saxton algorithm results in the desired phase profile of the wavefront, the phase discontinuity profiles of each metasurface $\phi_{MS1}$ and $\phi_{MS2}$ are determined by calculating the difference in phase of the tangential fields.

$$\phi_{MS1} = \phi_{t1} - \phi_{inc} \qquad (S12)$$

$$\phi_{MS2} = \phi_{des} - \phi_{i2} \qquad (S13)$$

With the field distributions fully determined throughout all three regions, the bianisotropic surface parameters of the metasurfaces are calculated as indicated at 56. These parameters describe the surface properties implementing the conversions in wave impedance, phase, and polarization of the fields. Since the field solutions in each region have been scaled to conserve power flow through the boundaries, these bianisotropic parameters represent passive and lossless Huygens' surfaces.

For example, a surface boundary between two regions can be described in terms of an electric admittance (Y), magnetic impedance (Z), and magneto-electric terms (X, Y). These surface parameters relate the averaged tangential fields ($E_{avg}$ and $H_{avg}$) on either side of the boundary to the electric and magnetic current densities (J and M) induced on the boundary:

$$\begin{bmatrix} J \\ M \end{bmatrix} = \begin{bmatrix} \overline{\overline{Y}} & \overline{\overline{x}} \\ \overline{\overline{Y}} & \overline{\overline{Z}} \end{bmatrix} \begin{bmatrix} E_{avg} \\ H_{avg} \end{bmatrix} \qquad (S14)$$

These relations can be manipulated to express the surface parameters in terms of the incident and transmitted fields. Assuming an isotropic and reciprocal surface with no change in polarization, the surface parameters can be simplified to $$\bar{\bar{Y}} = Y\begin{bmatrix} 1 & 0 \\ 0 & 1 \end{bmatrix} \bar{\bar{Z}} = Z\begin{bmatrix} 1 & 0 \\ 0 & 1 \end{bmatrix} \bar{\bar{\chi}} = \chi\begin{bmatrix} 0 & 1 \\ -1 & 0 \end{bmatrix} \bar{\bar{Y}} = -\chi^T = \chi = \begin{bmatrix} 0 & 1 \\ -1 & 0 \end{bmatrix} \quad (S15)$$

With the metasurface in the YZ plane, the induced surface currents for a TE polarization (tangential fields are $E=E_z\hat{z}$, $H=H_y\hat{y}$) become:

$$J_z = Y E_{z,avg} - xH_{y,avg} M_y = -xE_{z,avg} - ZH_{y,avg}. \quad (S16)$$

Here $E_z^i$ and $H_y^i$ are the tangential electric and magnetic field components of the incident wavefront, and $E_z^t$ and $H_y^t$ are the tangential components of the transmitted fields. After applying the boundary conditions, and assuming no reflections, two complex equations with three complex unknowns result as follows:

$$\frac{1}{2}Y(E_z^t - E_z^i) = H_y^t\left(1 - \frac{\chi}{2}\right) - H_y^i\left(1 + \frac{\chi}{2}\right) \quad (S17)$$

$$E_z^t - E_z^i = -\frac{\chi}{2}(E_z^t + E_z^i) - \frac{z}{2}(H_y^t + H_y^i) \quad (S18)$$

Conversation of the local time-averaged power flux at each point requires $$\text{Re}\{E_z^i H_y^{i*}\} = \text{Re}\{E_z^t H_y^{t*}\}, \quad (S19)$$

and the lossless condition mandates that $$\text{Re}\{Y\} = \text{Re}\{Z\} = \text{Im}\{x\} = 0. \quad (S20)$$

Using all of these conditions to solve for the surface parameters results in $$\text{Re}\{\chi\} = \frac{2\text{Re}\{E_z^t H_y^{i*} - E_z^i H_y^{t*}\}}{\text{Re}\{(E_z^i + E_z^t)(H_y^i + H_y^t)^*\}} \quad (S21)$$

$$\text{Im}\{Y\} = \frac{2\text{Im}\{(E_z^i + E_z^t)*(H_y^i - H_y^t)\} + \text{Re}\{\chi\}\text{Im}\{(E_z^i + E_z^t)*(H_y^i + H_y^t)\}}{|E_z^i + E_z^t|^2} \quad (S22)$$

$$\text{Im}\{Z\} = \frac{2\text{Im}\{(E_z^i + E_z^t)(H_y^i - H_y^t)^*\} + \text{Re}\{\chi\}\text{Im}\{(E_z^i + E_z^t)(H_y^i + H_y^t)^*\}}{|H_y^i + H_y^t|^2} \quad (S23)$$

where the surface parameters are now defined in terms of the tangential fields. When a surface with these bianisotropic parameters is illuminated by $E_z^i$ and $H_y^i$, then $E_z^t$ and $H_y^t$ will be passively transmitted without losses or reflections. It should be noted that these equations are only valid when the field distributions locally satisfy conservation of local power flux. Further information for solving the surface parameters in terms of the fields tangential to the metasurface is described by A. Epstein et al., IEEE Transactions on Antennas and Propagation 64, 3880 (2016).

Figure 7A:
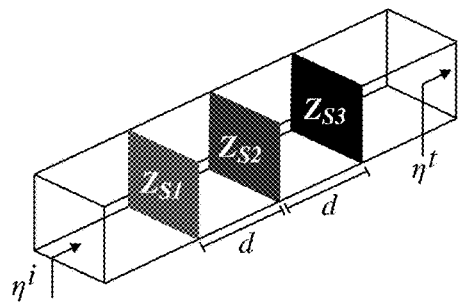
FIG. 7A is a diagram showing the unit cell of a bianisotropic Huygens' metasurface where three sheet impedances ($Z_s$) are separated by a distance of d, where the wave impedance on either side of the metasurface is denoted as $\eta^i$ for the incident field and $\eta^t$ for the transmitted field.

The field solution of the idealized metaoptic can be observed by explicitly defining the desired electric and magnetic surface current densities in place of the metasurfaces. FIG. 1B displays the results of a COMSOL Multiphysics (a commercial finite element electromagnetics solver) simulation where a normally incident Gaussian beam is expanded and a sinusoidal phase shift is imposed onto the desired field While this approach results in surface parameters that reshape the incident wavefront in amplitude and phase, one must translate these parameters into realizable metasurface designs. To do so, one can make use of bianisotropic Huygens' metasurfaces, which consist of a closely-spaced cascade of electric impedance sheets. FIG. 7A shows a unit cell of the Huygens' metasurface, where three electric sheet impedances are separated by a deeply sub-wavelength distance d. Unit cells of this structure can locally exhibit equivalent electric and magnetic current densities and be placed side-by-side to produce a gradient metasurface.

Figure 7B:
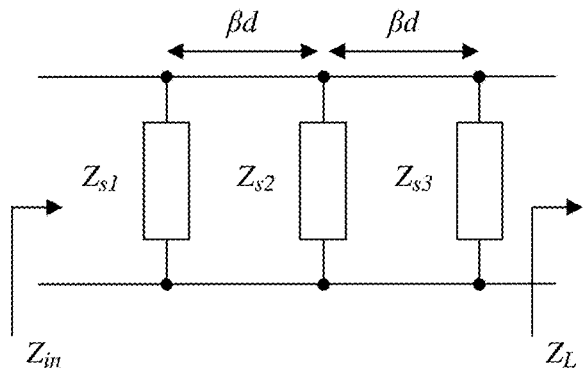
FIG. 7B is a diagram showing the bianisotropic Huygens' metasurface unit cell of FIG. 7A modeled by the transmission line circuit shown where three shunt impedances are separated by transmission lines, where the input and load impedances ($Z_{in}$ and $Z_L$) are taken as equal to the wave impedances.

To analyze the metasurface unit cell of FIG. 7A, one can model it as a transmission-line circuit as shown in FIG. 7B. The transmission-line model contains three shunt impedance values (representing the impedance sheets), separated by an electrical length of βd. The input and load impedances ($Z_{in}$ and $Z_L$) of the transmission-line model are taken to be the transverse electric wave impedances on either side of the metasurface.

The three variable parameters of the circuit model (shunt impedances) allow control over three desired characteristics for each metasurface unit cell. In an example embodiment, the desired characteristics are: (1) input impedance matched to the local incident wave impedance, (2) load impedance matched to the local transmitted wave impedance, and (3) a desired phase delay through the surface. Matching the input and load impedances serves to eliminate reflections from the boundary and the desired phase delay implements the local metasurface phase discontinuity. Since the tangential fields are known along both metasurfaces, individual unit cell parameters are defined to locally satisfy these distributions.

Using the procedure described above, the compound metaoptic is designed such that a wavefront incident on the system is altered in amplitude and phase to produce a desired complex field distribution. Two simulation examples of altering the amplitude and phase profiles of an incident Gaussian beam (beam radius of 5λ) are provided using the compound metasurface system.

Figure 8C:
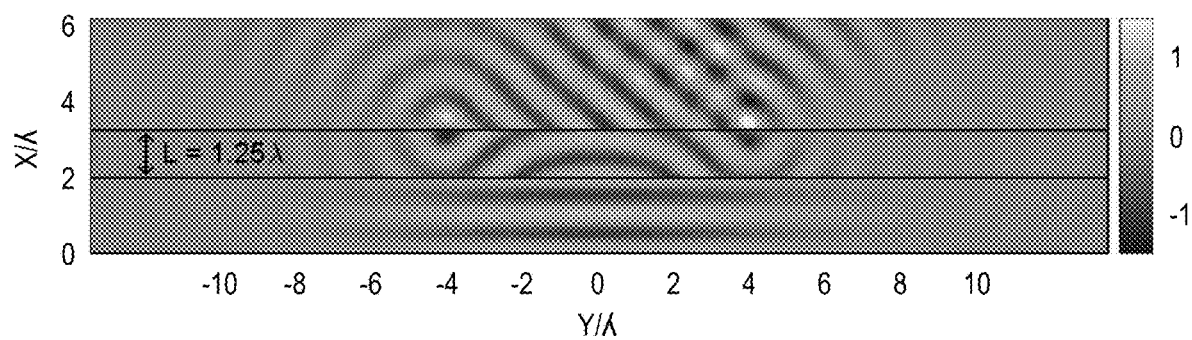
FIG. 8C is a graph showing the simulated time snapshot of the electric field for a compound metaoptic designed to re-shape an incident Gaussian beam to produce a Dolph-Chebyschev far-field pattern scanned towards 40 degrees.
Figure 8A:
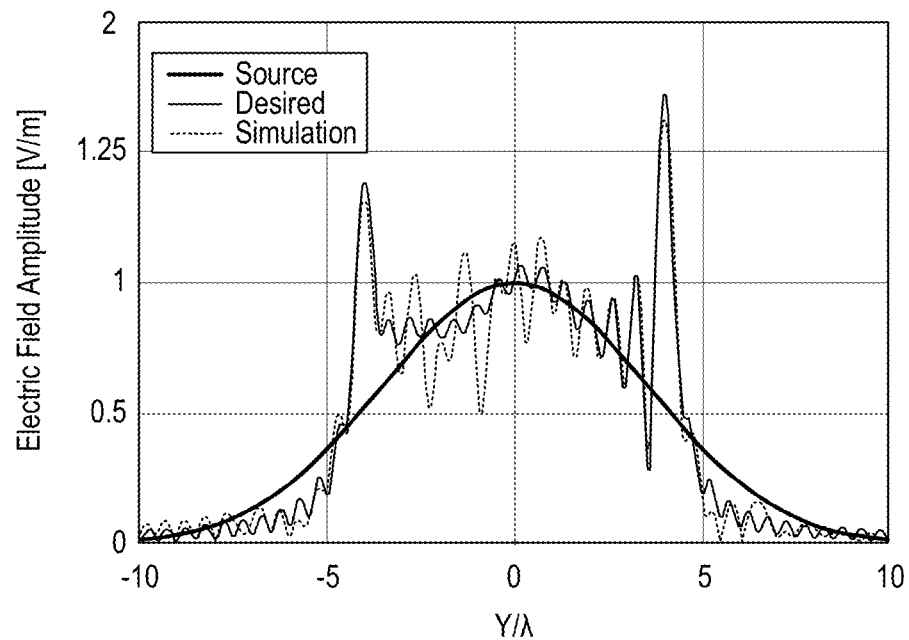
FIG. 8A is a graph showing the electric field amplitude at the output (exit face) of a compound metaoptic designed to re-shape an incident Gaussian beam to produce a Dolph-Chebyschev far-field pattern scanned towards 40 degrees.

In the first example, the amplitude and phase profiles of the incident Gaussian beam are re-shaped to produce a Dolph-Chebyschev far-field pattern with a beam pointing direction of 40 degrees. This far-field pattern exhibits the narrowest beamwidth for a given sidelobe level. Sinc function interpolation of the discrete array element weights was employed to determine an equivalent continuous electric field distribution. FIG. 8A shows the desired continuous amplitude distribution for a far-field pattern having sidelobes of −15 dB.

Figure 8B:
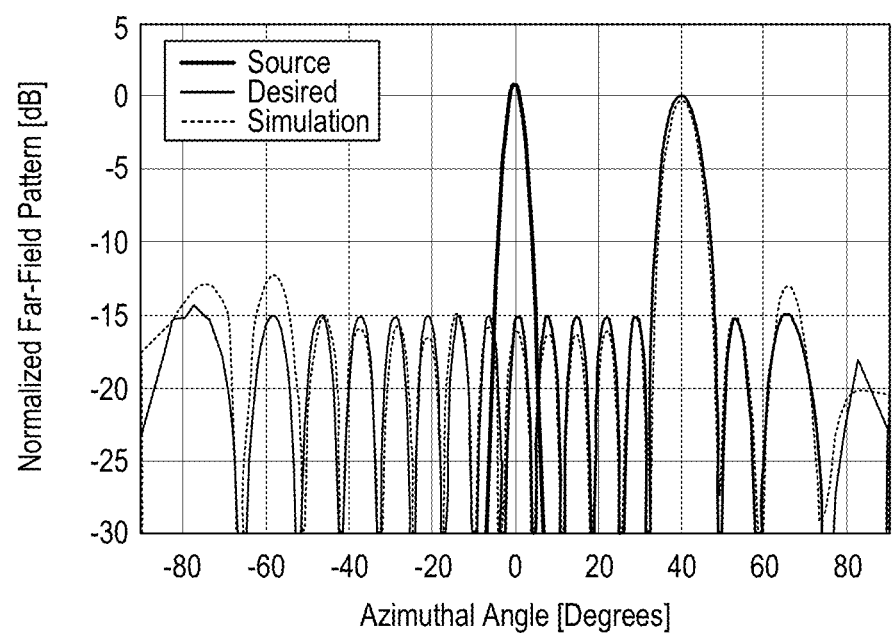
FIG. 8B is a graph showing the far-field pattern for a compound metaoptic designed to re-shape an incident Gaussian beam to produce a Dolph-Chebyschev far-field pattern scanned towards 40 degrees.

The sheet impedance values of the metasurfaces were calculated for a separation distance of L=1.25λ, a unit cell width of λ/16, and an impedance sheet separation of d=λ/80. The sheet impedances were modeled as ideal impedance boundaries in the commercial full-wave electromagnetics solver COMSOL Multiphysics. FIG. 8B shows the far-field pattern of the metaoptic closely matches the desired Dolph-Chebyschev pattern. In this case, each of the sidelobes are nearly −15 dB relative to the main lobe and all pattern nulls are located at the correct angle. FIG. 8C shows the simulated electric field, where the first metasurface performs the amplitude conversion over the separation distance L and the second metasurface points the main beam toward 40 degrees. FIG. 8C also shows that there are nearly no reflections from the compound metaoptic.

Figure 9A:
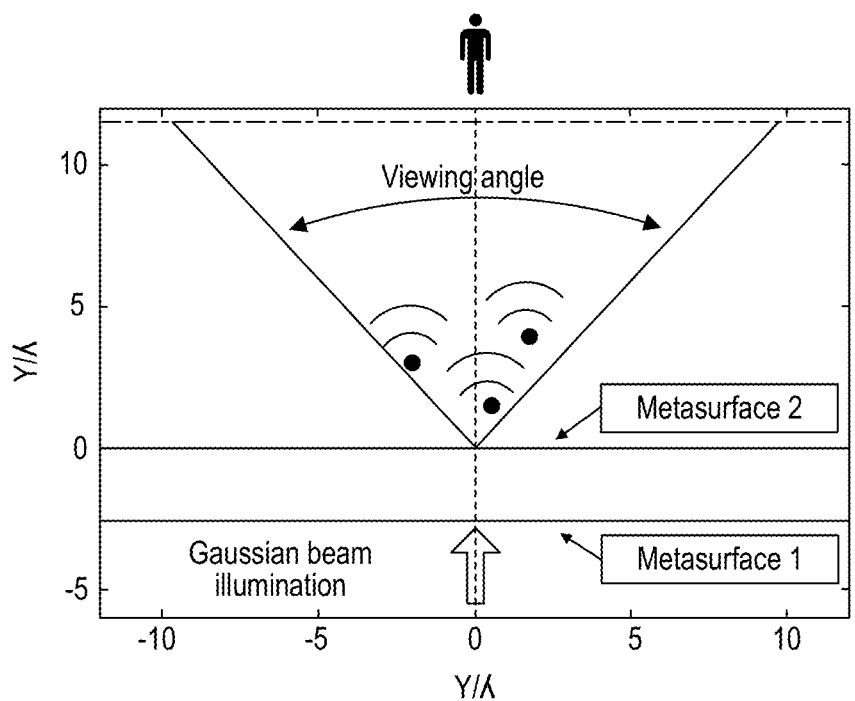
FIG. 9A is a graph showing the line scatterer geometry for which a compound metaoptic produces an identical electric field to the field scattered from three line scatterers. The recreated field presents an image of the line sources to an observer located in the ±40 degree viewing angle.

In the second example, the compound metaoptic is designed to radiate a field identical to the field scattered by three line scatterers. Essentially, the compound metaoptic realizes a simple complex-valued hologram of the scatterers. The virtual point scatterers are in the region beyond the metasurface system (x>0), as shown in FIG. 9A. The scattered plane wave spectrum associated with each point scatterer is calculated assuming an incident plane wave traveling in the −x direction. The spectra are summed together to obtain the plane wave spectrum of the total scattered field along the x=0 plane. A windowing function was applied to this spectrum such that the scattered field is visible over an azimuthal range between ±40 degrees. The desired spatial electric field distribution is obtained from the windowed plane wave spectrum and used to design the compound metaoptic.

Figure 9B:
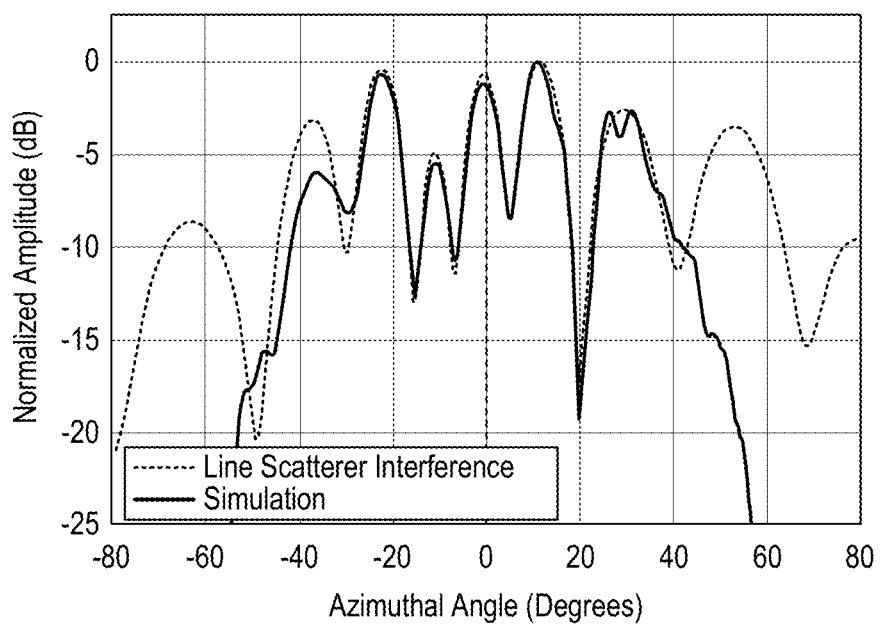
FIG. 9B is a graph showing the transmitted field amplitude the compound metaoptic at a distance of 11.5λ from the metaoptic.
Figure 9C:
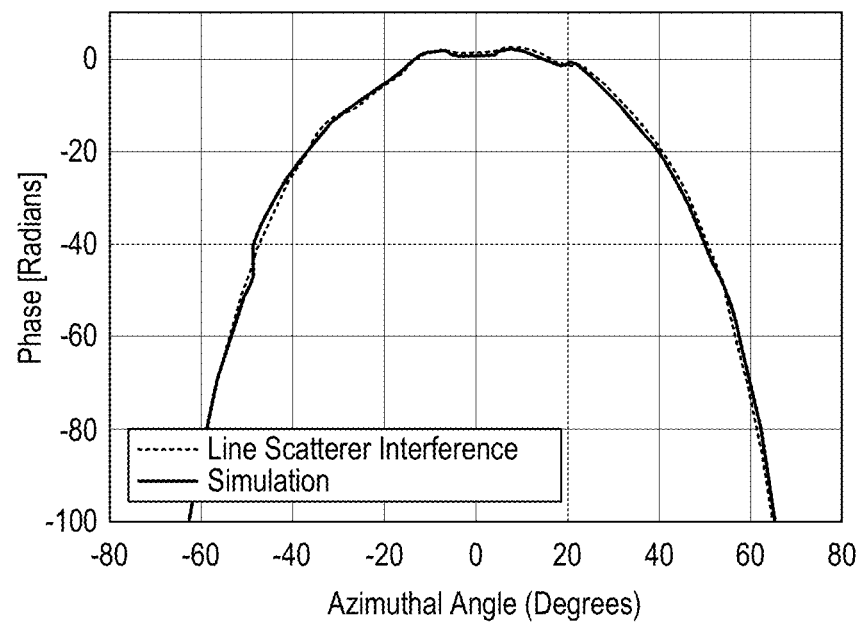
FIG. 9C is a graph showing the transmitted field phase for the compound metaoptic at a distance of 11.5λ from the metaoptic.
Figure 9D:
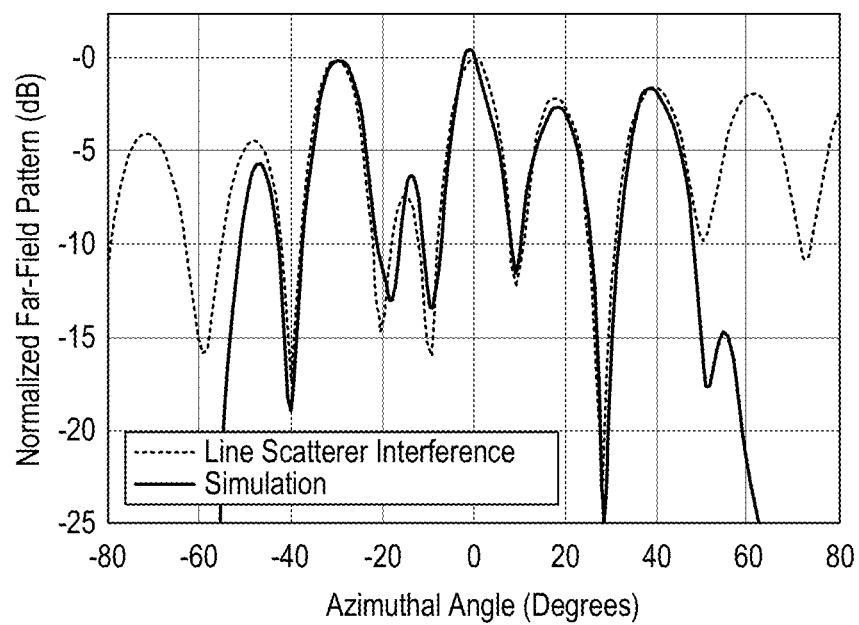
FIG. 9D is a graph showing the far-field magnitude pattern for the simulated and desired scattered field distributions.

The metasurfaces were designed with a separation distance of L=2.252λ, a unit cell dimension of λ/16, and an impedance sheet spacing of d=λ/60. FIGS. 9A and 9B compare the simulated electric field amplitude and phase, respectively, at a distance of 11.5λ from the metasurface system with the desired interference pattern of the three line scatterers. One can see that the complex-valued electric field produced by the compound metaoptic closely matches the ideal interference pattern of the three line scatterers (in amplitude and phase) over the wide azimuthal range of ±40 degrees. This is achieved even at short distances from the metaoptic. FIG. 9D shows the far-field scattering pattern also closely matches the true interference pattern over the desired azimuthal range. This demonstrates that the compound metaoptic is capable of producing the scattered field from known objects.

The proposed compound metaoptic uses two phase-discontinuous metasurfaces to mold the available power density from the source field into a desired phase and power density distribution. In many cases, the bianisotropic properties of a Huygens' metasurface enabled the separation distance of the phase-discontinuous metasurfaces to be on the order of a wavelength.

The proposed approach to generating field profiles with independent phase and power density distributions using two phase planes (reflectionless metasurfaces) may find applications in 3D holographic display technology. In addition, the approach presents a new design paradigm for electronically scanned antennas. Conventional approaches at microwaveor millimeter-wave frequencies utilize a phased array, where phase shifters provide beam steering and amplifiers/attenuators provide beam shaping. Such a method becomes increasingly difficult to implement at shorter wavelengths due to transistor cutoff frequencies and the losses associated with array feeding network. The proposed approach is especially attractive at millimeter-wave frequencies and beyond, given that it allows simultaneous beam shaping (amplitude control) and beam steering (phase control) simply by using two phase planes. Other applications for the compound metaoptic includes but is not limited to glasses for virtual and augmented reality systems The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compound metaoptic, comprising:
   a first metasurface is configured to receive electromagnetic radiation incident thereon and spatially separated by a distance from a second metasurface and change the power density distribution of the electromagnetic radiation incident thereon to a target power density distribution at a given distance;
   wherein the first metasurface operates to refract the electromagnetic radiation onto the second metasurface without reflection and loss and thereby change the power density distribution of the electromagnetic radiation at surface of the second metasurface to match the target power density distribution;
   wherein the second metasurface is spatially separated from the first metasurface by the given distance and configured to receive the refracted electromagnetic radiation from the first metasurface and operates to correct the phase of the electromagnetic radiation to match a target phase distribution or a target polarization distribution;
   wherein the first metasurface and the second metasurface exhibit bianisotropic properties.

2. The compound metaoptic of claim 1 wherein the first metasurface and the second metasurface are surfaces textured at a subwavelength scale in relation to wavelength of the electromagnetic radiation incident thereon.

3. The compound metaoptic of claim 1 wherein the first metasurface and the second metasurface are further defined as Huygens' metasurfaces.

4. The compound metaoptic of claim 1 wherein at least one of the first metasurface or the second metasurface is comprised of a series of dielectric gratings separated by dielectric spacers.

5. The compound metaoptic of claim 1 wherein at least one of the first metasurface or the second metasurface is comprised of multiple impedance sheets cascaded in propagation direction of the electromagnetic radiation.

6. The compound metaoptic of claim 1 wherein the distance between the first metasurface and the second metasurface is on the order of wavelength of the electromagnetic radiation incident thereon.

7. The compound metaoptic of claim 1 wherein the distance between the first metasurface and the second metasurface is smaller than the wavelength of the electromagnetic radiation incident thereon.

8. The compound metaoptic of claim 1 wherein the distance between the first metasurface and the second metasurface is larger than the wavelength of the electromagnetic radiation incident thereon.

9. The compound metaoptic of claim 1 further comprises a controller electrically coupled to at least one of the first metasurface or the second metasurface, such that at least one of the first metasurface or the second metasurface is divided into a plurality of unit cells and each unit cell is configured to receive a bias voltage from the controller.

10. The compound metaoptic of claim 1 resides in a three-dimensional holographic display.

11. The compound metaoptic of claim 1 resides in an antenna.

12. The compound metaoptic of claim 1 resides in an imaging system.

* * * * *